United States Patent
Cao et al.

(10) Patent No.: US 9,317,112 B2
(45) Date of Patent: Apr. 19, 2016

(54) MOTION CONTROL OF A VIRTUAL ENVIRONMENT

(71) Applicant: MICROSOFT TECHNOLOGY LICENSING, LLC, Redmond, WA (US)

(72) Inventors: Xiang Cao, Beijing (CN); Takaaki Shiratori, Beijing (CN); Xin Tong, Beijing (CN); Feng Xu, Beijing (CN); Thomas Gersten, Redmond, WA (US); Tommer Leyvand, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 31 days.

(21) Appl. No.: 14/084,481

(22) Filed: Nov. 19, 2013

(65) Prior Publication Data
US 2015/0138063 A1    May 21, 2015

(51) Int. Cl.
*G09G 5/00* (2006.01)
*G06F 3/01* (2006.01)
*G06F 3/00* (2006.01)
*G06K 9/00* (2006.01)
*G06F 3/03* (2006.01)
*H04N 13/00* (2006.01)

(52) U.S. Cl.
CPC ................ *G06F 3/011* (2013.01); *G06F 3/005* (2013.01); *G06F 3/017* (2013.01); *G06F 3/0304* (2013.01); *G06K 9/00362* (2013.01); *H04N 2013/0085* (2013.01)

(58) Field of Classification Search
CPC ......... G06F 3/005; G06F 3/011; G06F 3/017; G06F 3/048–3/04897; G06F 3/0304; G06K 9/00362; H04N 2013/0085
USPC ........................................................ 345/156
See application file for complete search history.

(56) References Cited

U.S. PATENT DOCUMENTS

| 7,739,479 | B2 | 6/2010 | Bordes et al. |
| 8,154,524 | B2 | 4/2012 | Wilson et al. |
| 8,994,652 | B2 * | 3/2015 | Fleischmann et al. ......... 345/156 |
| 2008/0166022 | A1 * | 7/2008 | Hildreth ........................ 382/107 |

(Continued)

FOREIGN PATENT DOCUMENTS

WO    2012112402 A2    8/2012

OTHER PUBLICATIONS

"Block-Matching Algorithm", Wikipedia, http://en.wikipedia.org/wiki/Block-matching_algorithm, Accessed: Aug. 13, 2013, 2 pages.

(Continued)

*Primary Examiner* — Stephen Sherman
(74) *Attorney, Agent, or Firm* — Dan Choi; Judy Yee; Micky Minhas (57) ABSTRACT

An optical flow of depth video of a depth camera imaging a human subject is recognized. An energy field created by motion of the human subject is generated as a function of the optical flow and specified rules of a physical simulation of the virtual environment. The energy field is mapped to a virtual position in the virtual environment. A property of a virtual object in the virtual environment is adjusted based on a plurality of energy elements of the energy field in response to the virtual object interacting with the virtual position of the energy field.

20 Claims, 7 Drawing Sheets

(56) References Cited

U.S. PATENT DOCUMENTS

| | | | |
|---|---|---|---|
| 2010/0234094 | A1 | 9/2010 | Gagner et al. |
| 2011/0164029 | A1* | 7/2011 | King et al. .................... 345/419 |
| 2011/0175810 | A1 | 7/2011 | Markovic et al. |
| 2012/0038582 | A1* | 2/2012 | Grant ............................ 345/174 |
| 2012/0327125 | A1* | 12/2012 | Kutliroff et al. .............. 345/660 |
| 2014/0037139 | A1* | 2/2014 | Lee et al. ....................... 382/103 |

OTHER PUBLICATIONS

Cao, Xiang et al., "ShapeTouch: Leveraging Contact Shape on Interactive Surfaces", 3rd IEEE International Workshop on Horizontal Interactive Human Computer Systems, Oct. 1, 2008, 8 pages.

Hilliges, Otmar et al., "HoloDesk: Direct 3D Interactions with a Situated See-Through Display", SIGCHI Conference on Human Factors in Computing Systems, May 5, 2012, 10 pages.

"Motion Estimation", Wikipedia, http://en.wikipedia.org/wiki/Motion_estimation, Accessed: Aug. 13, 2013, 2 pages.

"Optical Flow", Wikipedia, http://en.wikipedia.org/wiki/Optical_flow, Accessed: Aug. 13, 2013, 5 pages.

"Optical Flow—Block Matching—Bouncing", Youtube, http://www.youtube.com/watch?v=BDtvjKMI30w, Uploaded: Dec. 20, 2010, Accessed: Aug. 13, 2013, 4 pages.

Song, Peng et al., "Vision-based 3D Finger Interactions for Mixed Reality Games with Physics Simulation", 7th ACM SIGGRAPH International Conference on Virtual-Reality Continuum and Its Applications in Industry, Dec. 8, 2008, 6 pages.

Wilson, Andrew D. et al., "Bringing Physics to the Surface", ACM Symposium on User Interface Software and Technology, Oct. 19, 2008, 10 pages.

Izadi, S. et al., "KinectFusion: Real-time 3D Reconstruction and Interaction using a Moving Depth Camera", in Proceedings of the 24th Annual ACM Symposium on User Interface Software and Technology, pp. 559-568, Oct. 2011, 10 pages.

PhysX by NVIDIA User's Guide, "Particles", https://developer.nvidia.com/sites/default/files/akamai/physx/Manual/Particles.html, Jul. 1, 2013, 9 pages.

ISA European Patent Office, International Search Report and Written Opinion Issued in PCT/US2014/066018, Mar. 9, 2015, Netherlands, 14 Pages.

Ipea European Patent Office, International Preliminary Report on Patentability issued in Application No. PCT/US2014/066018, Oct. 22, 2015, WIPO, 8 pages.

* cited by examiner

MOTION CONTROL OF A VIRTUAL ENVIRONMENT

BACKGROUND

Natural user-input (NUI) technologies aim to provide intuitive modes of interaction between computing systems and human beings. For example, a human subject's motion input may be recognized as a discrete gesture. The discrete gesture may be translated into a command to control a computing system. For example, the command may adjust a property of a virtual environment, such as in a video game or other virtual simulation. In some cases, control based on a discrete gesture may lack granularity and nuance, because a corresponding command may not change based on variations in motion when performing the discrete gesture. For example, a control command may not change based on whether the human subject performs a discrete gesture quickly or slowly. Furthermore, motions that do not narrowly conform to specific gestures may not produce the results a user expects in a virtual environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to controlling a virtual environment based on motion of a human subject are provided. In one embodiment, an optical flow of depth video of a depth camera imaging a human subject may be recognized. An energy field created by motion of the human subject may be generated as a function of the optical flow and specified rules of a physical simulation of a virtual environment. The energy field may be mapped to a virtual position in the virtual environment. A property of a virtual object in the virtual environment may be adjusted based on a plurality of energy elements of the energy field in response to the virtual object interacting with the virtual position of the energy field.

In another embodiment, a virtual skeleton that models a human subject with a plurality of virtual joints characterized by three-dimensional positions may be recognized. The virtual skeleton may be derived from depth video of a depth camera imaging the human subject. The virtual skeleton may be used to identify a gesture performed by the human subject. An optical flow of the depth video may be recognized. The optical flow may be used to assign a magnitude to the gesture performed by the human subject. A property of a virtual environment may be controlled as a function of the gesture and the magnitude.

DETAILED DESCRIPTION

This description relates to controlling properties of a virtual environment, such as in a video game or other virtual simulation, based on motion of a human subject. More particularly, this description relates to recognizing motion of a human subject to augment intermediate mechanisms for controlling properties of a virtual environment. For example, an optical flow may be recognized from video (e.g., depth/IR/RGB) received from an NUI interface system imaging the human subject. In particular, the optical flow may be derived from a plurality of cells mapped to the video. Each cell may include a motion value indicating a magnitude, direction, and/or another property of motion in that cell recognized between consecutive image frames of the video. The optical flow may holistically define movement across the entire image frame, in contrast to a discrete gesture that may be performed by a particular body part of the human subject. In other words, the optical flow may be used to gauge the overall character of the motion of the human subject, whether or not the human subject is properly performing a particular gesture that the system is trained to recognize.

The optical flow may be used to generate a dynamic energy field that is mapped to a virtual environment to control one or more properties of the virtual environment. Furthermore, the energy field may influence properties of virtual objects in the virtual environment that interact with the energy field. Motion of the human subject recognized in the form of the optical flow provides a robust input that may be used to augment intermediate mechanisms, such as a gesture or an energy field, in order to enhance control of the virtual environment. Such control may have an increased level of responsiveness, granularity, and/or nuance when compared to using discrete gestures alone.

Figure 1:
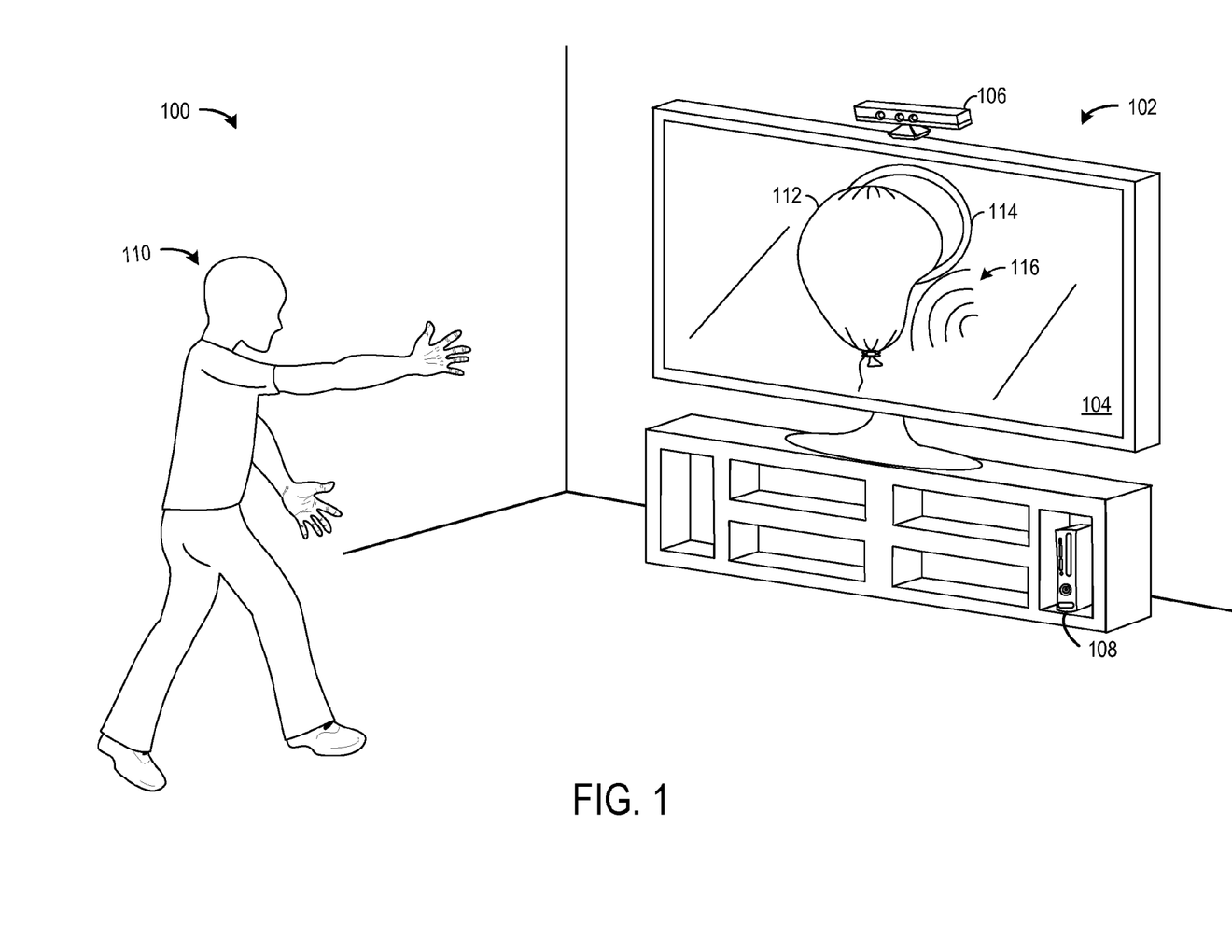
FIG. 1 shows an environment in which NUI is used to control a computing or game system, in accordance with an embodiment of this disclosure.

FIG. 1 shows aspects of an example environment 100. The illustrated environment is a living room or family room of a personal residence. However, the approaches described herein are equally applicable in other environments, such as retail stores and kiosks, restaurants, information kiosks, public-service environments, etc. In the environment 100, a home-entertainment system 102 is installed. The home-entertainment system includes a large-format display 104 and an NUI interface system 106, both operatively coupled to a computing system 108. The computing and NUI interface systems may be coupled via a wired link, a wireless link, or in another suitable manner. In the illustrated embodiment, the display presents computer-generated imagery (still images, video, graphical user interface elements, etc.). The computing system may be a video-game system; a multimedia system configured to play music and/or video; a general-purpose computing system used for internet browsing and productivity applications; and/or virtually any other type of computing system, including mobile computing systems, without departing from the scope of this disclosure.

The computing system 108 may be configured to accept various forms of user input. As such, traditional user-input devices such as a keyboard, mouse, touch-screen, gamepad, or joystick controller may be operatively coupled to the computing system. Regardless of whether traditional user-input modalities are supported, the computing system 108 accepts so-called natural user input (NUI) from at least one human subject 110. In the scenario represented in FIG. 1, the human subject is standing; in other scenarios, the human subject may be lying down or seated, again without departing from the scope of this disclosure.

The NUI interface system 106 may include various sensors for tracking the human subject. For example, the NUI interface system may include depth cameras, visible light (e.g., RGB color) cameras, and microphones. For example, such sensors may track motion and/or voice input of the human subject. However, in some embodiments, additional and/or different sensors may be utilized.

In the illustrated example, a virtual environment is presented on the display 104. The virtual environment includes a virtual balloon 112 that may be guided through a virtual ring 114 via motion of the human subject 110. In particular, the NUI interface system 106 may image the human subject. The video input may be sent to the computing system 108, which may recognize an optical flow of motion of the human subject from the video. Further, the computing system may generate an energy field 116 based on the optical flow of the motion of the human subject and specified rules of a physical simulation of the virtual environment. In particular, every cell of the optical flow may have a corresponding dynamic energy element having a plurality of energy properties that may be set and adjusted based on the specified rules of the physical simulation. The energy elements may be accumulated to create the energy field, and the energy field may be mapped to the virtual environment to manipulate the virtual balloon.

For example, the human subject may move his hand toward the virtual balloon in a pushing motion. The pushing motion may produce cells of the optical flow having motion values indicating a magnitude that contributes to the energy field, and the magnitude may be adjusted by the specified rules of the physical simulation. The effect of the energy field on the virtual balloon may be captured by computing a flux or other physical property of the energy field on the virtual balloon. For example, the energy field may alter a direction, speed, orientation, trajectory, shape, or other suitable property of the virtual balloon. In other words, the energy field may act as the "wind" surrounding the virtual balloon and the motion of the human subject may contribute energy to the energy field that causes the wind to blow at the balloon. The human subject may vary the speed and direction of the pushing motions to affect the direction and force that the wind applies to the virtual balloon in order to manipulate the virtual balloon through the virtual ring. Note that in this nonlimiting example, the illustrated pushing motion produces enough energy to deform the shape of the virtual balloon in addition to moving the virtual balloon. Such deformation may be determined based on physical properties of the physical simulation of the virtual environment.

In some embodiments, the energy field may be represented as a medium other than the wind. For example, in some embodiments, the energy field may be a fluid (e.g., water) and the physical simulation may apply fluid dynamics to the energy field to control how the fluid interacts in the virtual environment. In another example, the energy field may be represented as a supernatural phenomenon that is not based in reality. An energy field having virtually any realistic and/or unrealistic characteristics may be used. Furthermore, the energy field may be visually and/or audibly expressed to the user, or the energy field may be invisible and/or silent.

The energy field provides an intermediate mechanism of control that accounts for the specified rules that govern the physical properties (or pseudo-physical properties) of the virtual environment. Accordingly, motion of the human subject may be highly customizable to the particular virtual environment by tuning the specified rules used to generate the energy field. Different video games or virtual simulations may have different specified rules to generate and use the energy field differently. In other words, the specified rules of the physical simulation may dictate how motion is translated into energy applied to the energy field. Moreover, the specified rules of the physical simulation may dictate to which effects in the virtual environment the energy field may be mapped.

It will be understood that the illustrated virtual balloon scenario is provided to demonstrate a general concept, and the imaging, and subsequent modeling, of human subject(s) and or object(s) within a scene may be utilized in a variety of different applications without departing from the scope of this disclosure. More particularly, it will be understood that motion of the human subject, recognized via the optical flow, may be used to augment any suitable intermediate mechanism to control one or more properties of virtually any type of virtual environment.

Figure 2:
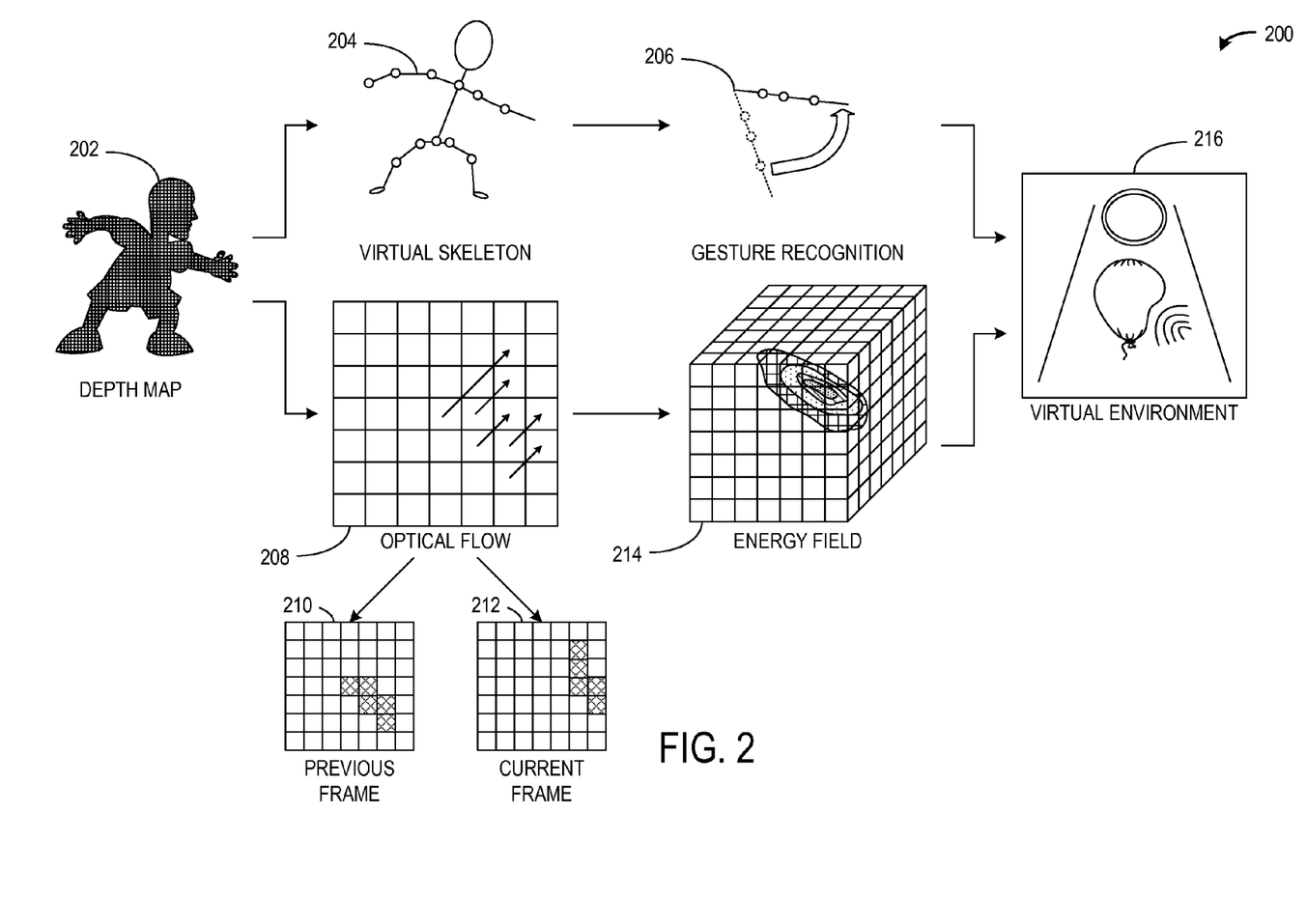
FIG. 2 shows an NUI pipeline in accordance with an embodiment of this disclosure.

FIG. 2 graphically shows a simplified NUI pipeline 200 that may be used to track motion of a human subject and control aspects of a virtual environment. It will be appreciated that the NUI pipeline may be implemented by any suitable computing system without departing from the scope of this disclosure. For example, the NUI interface system 106 and/or the computing system 108 may implement the NUI pipeline. It will be understood that the NUI pipeline may include additional and/or different processing steps than those illustrated without departing from the scope of this disclosure.

The NUI interface system may output various streams of information associated with different sensors of the NUI interface system. For example, the NUI system may output depth image information from one or more depth cameras, infrared (IR) image information from the one or more depth cameras, and color image information from one or more visible light cameras.

A depth map 202 may be output by the one or more depth cameras and/or generated from the depth image information output by the one or more depth cameras. The depth map may be made up of depth pixels that indicate a depth of a corresponding surface in the observed environment relative to the depth camera. It will be understood that the depth map may be determined via any suitable mechanisms or combination of mechanisms, and further may be defined according to any suitable coordinate system, without departing from the scope of this disclosure.

Additionally, or alternatively the NUI pipeline may include a color image made up of color pixels. The color pixels may be indicative of relative light intensity of a corresponding surface in the observed environment. The light intensity may be recorded for one or more light channels (e.g., red, green, blue, grayscale, etc.). For example, red/green/blue color values may be recorded for every color pixel of the color image. The color image may be generated from color image information output from one or more visible light cameras. Similarly, the NUI pipeline may include an IR image including IR values for every pixel in the IR image. The IR image may be generated from IR image information output from one or more depth cameras.

A virtual skeleton 204 that models the human subject may be recognized or generated based on analysis of the pixels of the depth map 202, a color image, and/or an IR image. According to an example modeling approach, pixels of the depth map may be assigned a body-part index. The body-part index may include a discrete identifier, confidence value, and/or body-part probability distribution indicating the body part or parts to which that pixel is likely to correspond. Body-part indices may be determined, assigned, and saved in any suitable manner. In some embodiments, body part indexes may be assigned via a classifier that is trained via machine learning.

The virtual skeleton 204 models the human subject with a plurality of skeletal segments pivotally coupled at a plurality of joints characterized by three-dimensional positions. In some embodiments, a body-part designation may be assigned to each skeletal segment and/or each joint. A virtual skeleton consistent with this disclosure may include virtually any type and number of skeletal segments and joints.

Positional changes in the various skeletal joints and/or segments may be analyzed to identify a gesture 206 performed by the human subject. It will be understood that a gesture may be identified according to any suitable gesture recognition technique without departing from the scope of this disclosure. The relative position, velocity, and/or acceleration of one or more joints relative to one or more other joints may be used to recognize gestures.

An optical flow 208 that can be independent of skeletal modeling may be recognized or generated based on analysis of the depth map 202 (or another image stream). For example, a depth map may be generated for each image frame of depth video that images the human subject. Each depth map may be divided in to a plurality of cells. In the illustrated example, the plurality of cells may be organized into a grid. Depth maps of consecutive image frames (e.g., a previous image frame 210 and a current image frame 212) of the depth video may be compared to identify cells that have motion. Each identified cell may have a motion value indicating a magnitude of motion for that cell. In this case, where the depth map is analyzed, the motion value may be derived from a changing depth value in the cell. In one example, the depth value for a cell may be an average of depth values of all pixels in that cell. A Z-axis component of the optical flow may be recognized from a difference in depth values in that cell between consecutive image frames. In other words, the magnitude of the optical flow in the cell may be at least partially calculated by subtracting the depth value in the cell of the previous image frame from the depth value in the cell of the current image frame. The X-axis and/or Y-axis components of the optical flow can optionally be assessed by tracking edges, neighboring cell analysis, and/or other suitable techniques.

It will be understood that the grid may be divided into any suitable number of cells without departing from the scope of this disclosure. In some embodiments, the grid may be mapped to an entire image frame. In other embodiments, the grip may be mapped to a designated portion of the image frame. In some cases, the designated portion may change from frame to frame as the human subject moves within the frame.

In some embodiments, a direction of the motion may be associated with the magnitude of the motion for each cell. The direction and the magnitude may provide a motion vector that describes the motion in the cell. In some embodiments, the magnitude and motion may be represented by vector components.

It will be appreciated that the optical flow additionally may characterize motion of one or more props held or wielded by the human subject. Because the optical flow holistically characterizes movement across the entire image frame, the motion of a prop may be characterized in addition to the motion of the human subject. Accordingly, the human subject may be able to use any suitable prop to generate motion that can be used to control the virtual environment. This approach offers potential advantages over an approach that relies only on skeletal modeling that is based on machine learning, because props for which the machine learning classifier has not been trained may be seamlessly integrated into the gaming/computing experience.

An energy field 214 may be generated as a function of the optical flow 208 and specified rules of a physical simulation of a virtual environment 216. The energy field may include a plurality of energy elements derived from the plurality of cells of the optical flow. Each energy element may include a plurality of energy properties derived from the motion value of a corresponding cell and the specified rules of the physical simulation. In one example, the specified rules may be defined by a game engine of a video game that generates the virtual environment. For example, the specified rules may specify initialization values of the plurality of energy properties of each energy element and adjust the plurality of energy properties of energy elements in the energy field. For example, the values of the energy properties may be adjusted on a frame by frame basis. In one example, the plurality of energy elements of the energy field may be arranged in a three-dimensional array of energy values. Non-limiting examples of the energy properties include a position, magnitude, shape, size, distribution, velocity, and lifespan. For example, the position may move over time, the magnitude may deteriorate over time, the size, shape, and/or distribution may deform over time, the velocity may be linear and/or angular and may decelerate over time, and the energy element may die once the lifespan has been reached. It will be understood that other properties that describe behavior of an energy element may be implemented.

For each image frame, new energy elements created from motion detected from the optical flow for that image frame may be added to the energy field. The energy field may be an accumulation of all living energy elements in the image frame. In particular, an energy element may have a lifespan that allows the energy element to remain "alive" in the energy field over multiple frames. Once an energy element reaches the lifespan, the energy element "dies" and is no longer part of the energy field. In other words, for any given image frame of the depth video, the energy field may include an accumulation of energy elements actively contributing energy of motion in that image frame.

In the illustrated embodiment, the energy field may be visualized as a 3D heat map with different portions of the energy field having different patterns indicative of different magnitudes of motion energy (or different values of other energy properties). It will be understood that the visual effects of the energy field may be defined by the specified rules of the physical simulation of the virtual environment (e.g., the game engine). In some cases, the energy field may not be visualized in the virtual environment.

Optionally, when generating the energy field, motion values from cells representative of a designated motion may be filtered out, such that the designated motion does not contribute energy to the energy field. For example, the specified rules of a game engine may designate which motions may be filtered out of the energy field calculation. Different video games may filter out different motions. Moreover, different scenarios within the same video game may filter out different motions. Non-limiting examples of different motion filters that may be applied by the game engine may include no-filter, keep-forward-motion, ignore-backward-motion, keep-smooth-motion, and keep-abrupt-motion. The no-filter keeps all motion. The keep-forward-motion keeps motion that has a general forward trend (e.g., motion vectors in a hemisphere that has a negative z depth component). The ignore-backward-motion is similar to the keep-forward-motion, but also allows sideways motion. The keep-smooth-motion keeps motion with a low acceleration/deceleration or a low jerk (the derivative of acceleration). The keep-abrupt-motion may be an inverse of the keep-smooth-motion. The smooth and abrupt filter may track the motion across >=3 image frames (>=4 image frames for jerk).

It will be appreciated that the motion of a prop used by the human subject may contribute to the energy field, because the energy field is derived from the optical flow that characterizes motion of the prop and the human subject.

Alternatively or additionally, in some embodiments, the energy field 214 may be at least partially based on the virtual skeleton 204. For example, a set of points along each bone and/or joint of the virtual skeleton may be sampled between image frames and the difference in position may produce a motion value for that bone or joint. The energy elements that make up the energy field may be derived from the motion values of the bones or joints of the virtual skeleton. Further, in some embodiments, the energy field may be generated based on the virtual skeleton 204 and the optical flow 208.

In different embodiments, one or more properties of the virtual environment 216 may be controlled by different intermediate mechanisms of motion control generated in the NUI pipeline. In one embodiment, the gesture 206 may be augmented by the optical flow 208. In particular, the optical flow may be used to assign a magnitude to the gesture 206. In one example, motion values of cells that correspond to parts of the virtual skeleton that perform the gesture may be averaged to provide the magnitude for the gesture. Further, a property of the virtual environment 216 may be controlled as a function of the gesture and the magnitude. For example, gestures may be mapped to effects that may influence virtual objects in the virtual environment. When the gesture is performed by the human subject, the effect may influence a property of the virtual object according to the magnitude.

In the illustrated scenario of the virtual balloon, a push gesture that pushes the virtual balloon in a particular direction may be recognized. A magnitude of the gesture may be determined based on the dimension and speed of the motion of the push gesture as derived from the optical flow. The magnitude may affect how much the virtual balloon travels in the particular direction as a result of the push gesture. By augmenting the push gesture with the magnitude derived from the optical flow, the affect of the push gesture on the properties of the virtual balloon may vary as the motion of the human subject varies when performing the gesture (e.g., fast vs. slow).

It will be understood that different gestures may be mapped to different effects in the virtual environment. Moreover, the same gesture may be mapped to different effects in different virtual environments (e.g., different video games) or different portions of a virtual environment (e.g., different scenarios in the same video game).

In some embodiments, weights may be associated with parts of the virtual skeleton 204. For example, different parts may have different weights for different gestures. The magnitude assigned to a gesture may be based at least partially on the weight of the parts that contribute to performing the gesture. In the illustrated example of the push gesture, a weight associated with a forearm may be greater than a weight of a shoulder, because the forearm creates more motion when performing the push gesture.

In another embodiment, the energy field 214 may be mapped to a virtual position in the virtual environment 216 so that the energy field may interact with virtual objects in the virtual environment. In other words, the energy field position may be mapped from physical input space to virtual game space. In particular, the mapping process creates a volumetric energy field in the virtual environment. For example, the mapping process may include various scaling/translation/rotation transformations applied according to the specified rules of the physical simulation of the virtual environment provided by the game engine.

Furthermore, the energy field may be mapped to one or more effects in the virtual environment. For example, the effect of the energy field on a virtual object in the virtual environment may be determined by computing a flux or other physical simulation of the effect interacting with the virtual object. For example, one or more designated energy properties of the energy elements of the energy field may be accumulated or averaged to determine the flux of the energy field on the virtual object. In the illustrated virtual balloon scenario, the virtual balloon may have a direction, speed, orientation, trajectory, etc. altered based on an interaction with the energy field. As another example, the energy field may be mapped to a damage effect in the virtual environment such that when a virtual object interacts with the energy field, the flux of the energy field causes damage to the virtual object. For example, the damage may be calculated by accumulating one or more energy property values of energy elements in the energy field. It will be understood that the energy field may be mapped to any suitable game effect without departing from the scope of this disclosure.

In some embodiments, a property of the virtual object may be adjusted based on energy elements in a region of interest of the energy field that interacts with the virtual object. For example, a portion of the energy field that overlaps or intersects with the virtual object in the virtual environment may be determined to be the region of interest. More particularly, the energy field may occupy a volume in the virtual environment. When a virtual object interacts with a portion of the volume, that portion may be determined to be the region of interest. In some cases, the region of interest may be smaller than a total volume of the energy field. In other cases, the region of interest may be the entire volume of the energy field.

Furthermore, a property of the virtual object in the virtual environment may be adjusted based on an accumulation of values of one or more energy properties of energy elements in the region of interest. In other words, in this case, only energy elements in the region of interest contribute to adjusting the property of the virtual object, and energy elements outside the region of interest may not contribute to adjusting the property of the virtual object. In one example, the energy properties may include a magnitude of motion and a velocity of the energy elements in the region of interest, and the magnitudes and the velocities of the energy elements may be accumulated to generate a momentum applied to the virtual object.

By adjusting the property of the virtual object based on energy elements in the region of interest, nuances of control may be increased relative to control via a discrete gesture. Moreover, such nuance provides opportunities in game-skill development (e.g., improving motion accuracy) that may enhance a gaming experience.

The foregoing description of the NUI pipeline should not be construed to limit the range of approaches that may be used to construct a virtual skeleton, an optical flow, or an energy field as such models of motion may be derived in any suitable manner without departing from the scope of this disclosure.

Figure 3:
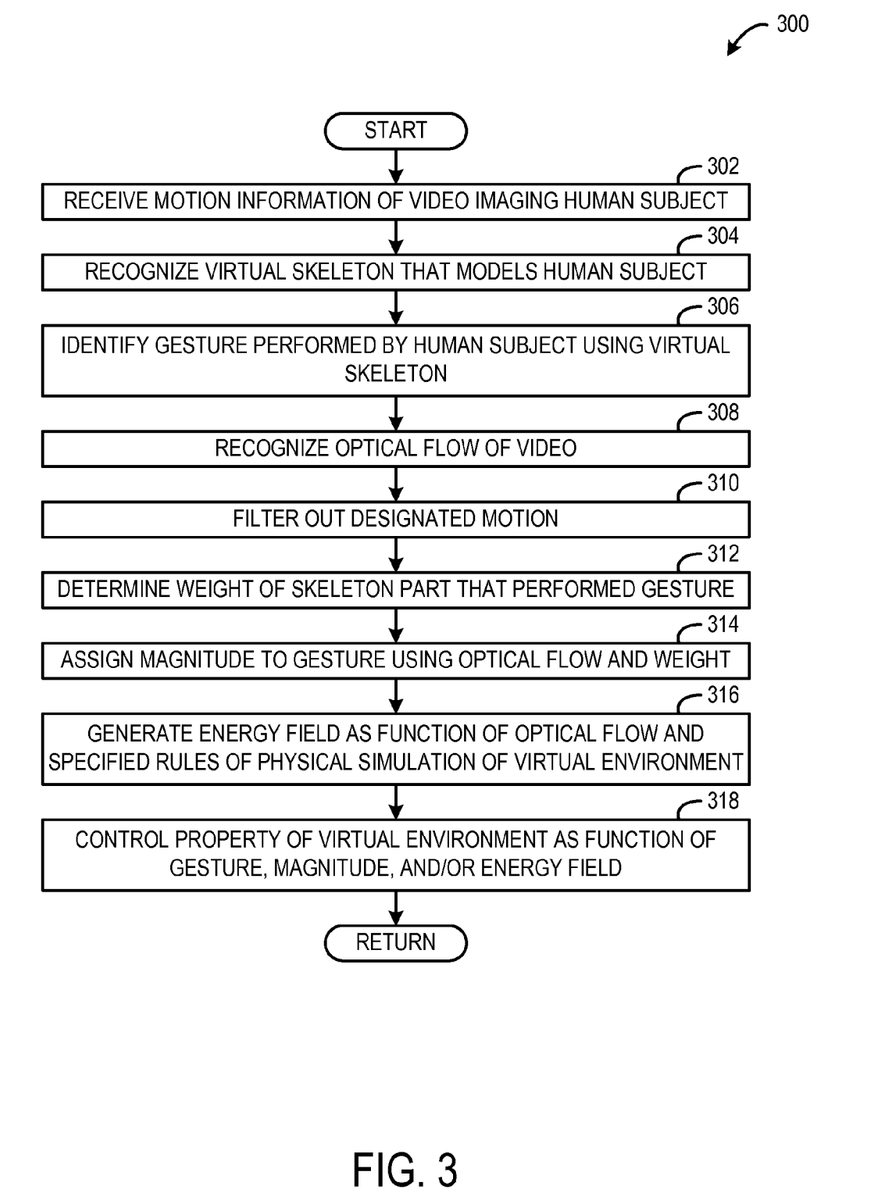
FIG. 3 shows a method for controlling a virtual environment in accordance with an embodiment of this disclosure.

FIG. 3 shows a method 300 for controlling a virtual environment in accordance with an embodiment of this disclosure. For example, the method may be performed by the computing system 108 shown in FIG. 1.

At 302, the method 300 may include receiving motion information of video imaging a human subject. For example, the motion information may be indicative of depth video received from a depth camera, color video received from a visible light camera, and/or IR video received from a depth camera.

At 304, the method 300 may include recognizing a virtual skeleton that models the human subject. The virtual skeleton may include a plurality of virtual joints characterized by three-dimensional positions. The virtual skeleton may be derived from the motion information of the video imaging the human subject.

At 306, the method 300 may include identifying a gesture performed by the human subject using the virtual skeleton.

At 308, the method 300 may include recognizing an optical flow of the video. The optical flow may be derived from a plurality of cells mapped to the video. In one example, the plurality of cells may be arranged in a grid of cells mapped to image frames of the video. Each cell may have a motion value indicating a magnitude of motion in that cell recognized between consecutive image frames of the video.

Optionally, at 310, the method 300 may include filtering out designated motion from the optical flow. The designated motion may be of no interest or may not be applicable to the virtual environment. In one example, the motion filter preferences may be determined by a game engine that defines the virtual environment. For example, backward motion and/or sideways motion may be filtered from the optical flow. As another example, jittery motion may be filtered out in order to reduce noise.

Optionally, at 312, the method 300 may include determining weights associated with parts of the virtual skeleton that perform the gesture.

At 314, the method 300 may include assigning a magnitude to the gesture using the optical flow. For example, motion values of cells of the optical flow that correspond to the virtual skeleton may be accumulated to determine the magnitude. Further, if weights are determined for the parts of the virtual skeleton that perform the gesture, then the magnitude may be determined based on the optical flow and the weights.

Optionally, at 316, the method 300 may include generating an energy field created by motion of the human subject as a function of the optical flow and specified rules of a physical simulation of the virtual environment. The energy field may include a plurality of energy elements derived from the plurality of cells of the optical flow. Each energy element may include a plurality of energy properties derived from the motion value of a corresponding cell and the specified rules of the physical simulation.

At 318, the method 300 may include controlling a property of the virtual environment as a function of the gesture and the magnitude. In one example, controlling a property of the virtual environment may include adjusting a property of a virtual object in the virtual environment to which the gesture is directed.

The gesture may be mapped to various effects in the virtual environment. For example, the gesture may be indicative of an attack and the property of the virtual environment may be an amount of damage caused by the attack on a virtual object in the virtual environment. As another example, the property may include a virtual force applied to a virtual object in the virtual environment. The force applied as a result of the gesture may cause the virtual object to alter its direction, speed, orientation, trajectory etc.

Furthermore, if the energy field is generated, then the property of the virtual environment may be controlled as a function of the gesture, the magnitude, and the energy field. For example, one or more energy properties of energy elements of the energy field that correspond to the parts of the virtual skeleton that perform the gesture may influence control of the virtual environment.

Figure 4:
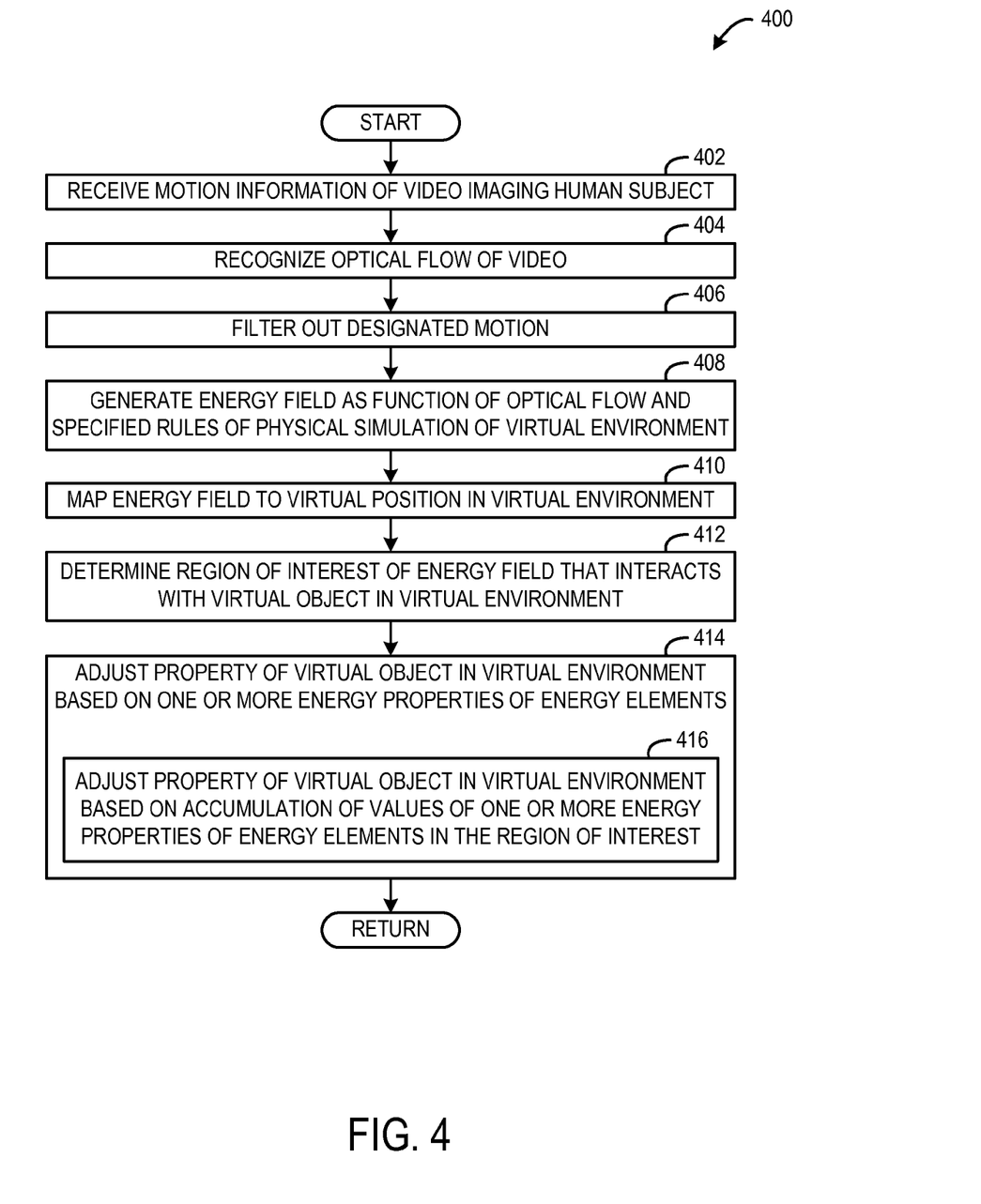
FIG. 4 shows a method for controlling a virtual environment in accordance with another embodiment of this disclosure.

FIG. 4 shows a method 400 for controlling a virtual environment in accordance with another embodiment of this disclosure. For example, the method may be performed by the computing system 108 shown in FIG. 1.

At 402, the method 400 may include receiving motion information of video imaging a human subject.

At 404, the method 400 may include recognizing an optical flow of the video.

Optionally, at 406, the method 400 may include filtering out designated motion from the optical flow.

At 408, the method 400 may include generating an energy field created by motion of the human subject as a function of the optical flow and specified rules of a physical simulation of the virtual environment.

At 410, the method 400 may include mapping the energy field to a virtual position in the virtual environment.

Optionally, at 412, the method 400 may include determining a region of interest of the energy field that interacts with a virtual object in the virtual environment.

At 414, the method 400 may include adjusting a property of a virtual object in the virtual environment based on one or more energy properties of the plurality of energy elements of the energy field in response to the virtual object interacting with the virtual position of the energy field. For example, an energy property of all energy elements in the energy field may be accumulated to determine a magnitude of a virtual force (or another effect) applied to the virtual object.

Optionally, if a region of interest is determined, at 416, the method 400 may include adjusting the property of the virtual object in the virtual environment based on an accumulation of values of one or more energy properties of energy elements in the region of interest. It will be understood that the values of the energy properties may be accumulated or sampled in any suitable manner to adjust the property of the virtual object. For example, an average of the values may be used to adjust the property of the virtual object.

Figure 5:
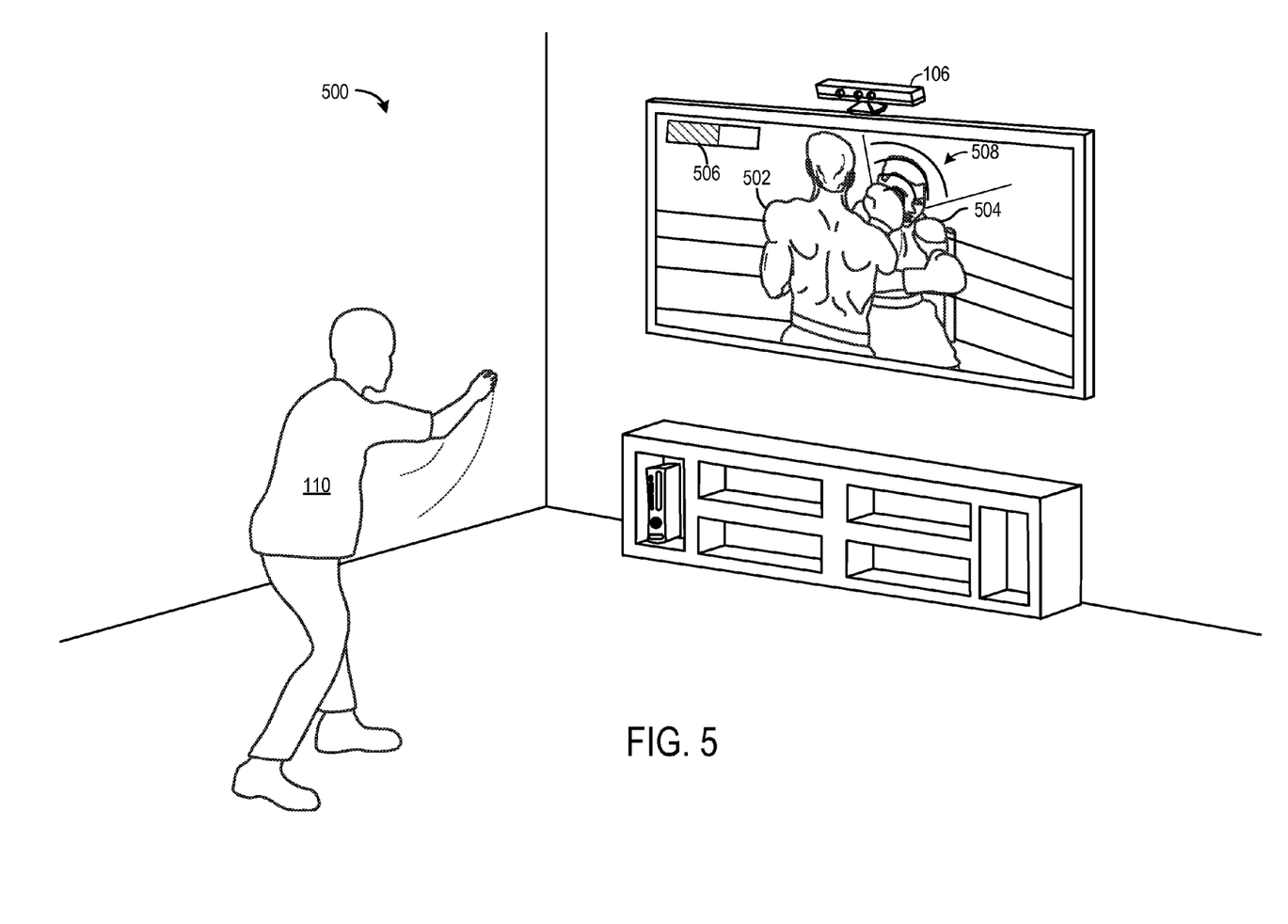
FIG. 5 shows a scenario in which an energy field indicative of a human subject's motion deals an amount of damage to a virtual object in accordance with an embodiment of this disclosure.

FIG. 5 shows a scenario 500 in which an energy field indicative of a human subject's motion deals an amount of damage to a virtual object in accordance with an embodiment of this disclosure. The human subject 110 is depicted playing a boxing video game where motion of the human subject controls actions of a virtual avatar 502 that is boxing a virtual opponent 504. The virtual opponent may have a damage tolerance level 506 that may be represented by a health meter.

An energy field 508 may be created by motion of the human subject as a function of an optical flow and specified rules of a game engine of the boxing video game. The optical flow may be derived from depth video of the NUI interface system 106 imaging the human subject. The energy field may be mapped to a virtual position in the virtual environment, in this scenario, the boxing ring. Further, motion of the human subject may be mapped to motion of the virtual avatar 502 in the boxing ring, and the energy field may appear to emanate from the virtual avatar. The energy field may be mapped to a damage effect of the boxing video game, such that the energy field may deal an amount of damage that reduces the damage tolerance level of the virtual opponent in response to the energy field interacting with the virtual opponent.

In one example, when the human subject makes a punching motion, the energy field moves according to the punching motion and the specified rules of the game engine. In particular, the energy field may move along the arm and through the first of the virtual avatar as the punch is being thrown. If the punch lands on the virtual opponent such that the energy field interacts with the virtual opponent, then magnitudes associated with energy elements of the energy field may be accumulated to generate an amount of damage dealt to the virtual opponent to reduce the damage tolerance level.

In some embodiments, a region of interest of the energy field that interacts with the virtual opponent may be determined. In this case, magnitudes of energy elements in the region of interest may be accumulated to generate an amount of damage dealt to the virtual opponent to reduce the damage tolerance level.

In some embodiments, the motion of the human subject may be recognized as a gesture indicative of an attack, and a magnitude assigned to the gesture may be mapped to an amount of damage caused by the attack and dealt to the virtual opponent.

It is to be appreciated that while the above provided boxing example sets forth a situation in which a user punches, and an opponent takes damage, unseen energy field processing differentiates the play experience from what has previously been implemented using only skeletal tracking. For example, while conventional skeletal tracking may use a classifier that is trained via machine learning to recognize specific types of punches, some players may find it more desirable to use free-form attacks that more accurately express the artistry and individuality of their fighting techniques. For example, the human subject 110 may wish to do whirling spin kicks, two handed ear claps, head butts, bat swings, pillow throws, and/or other moves that a classifier is not trained to recognize. Via optical flow analysis, the intensity of these unclassified motions can be recognized and quantified, thus allowing the game to apply damage to the virtual opponent when not being able to specifically discern or otherwise classify the gestures of the player.

Figure 6:
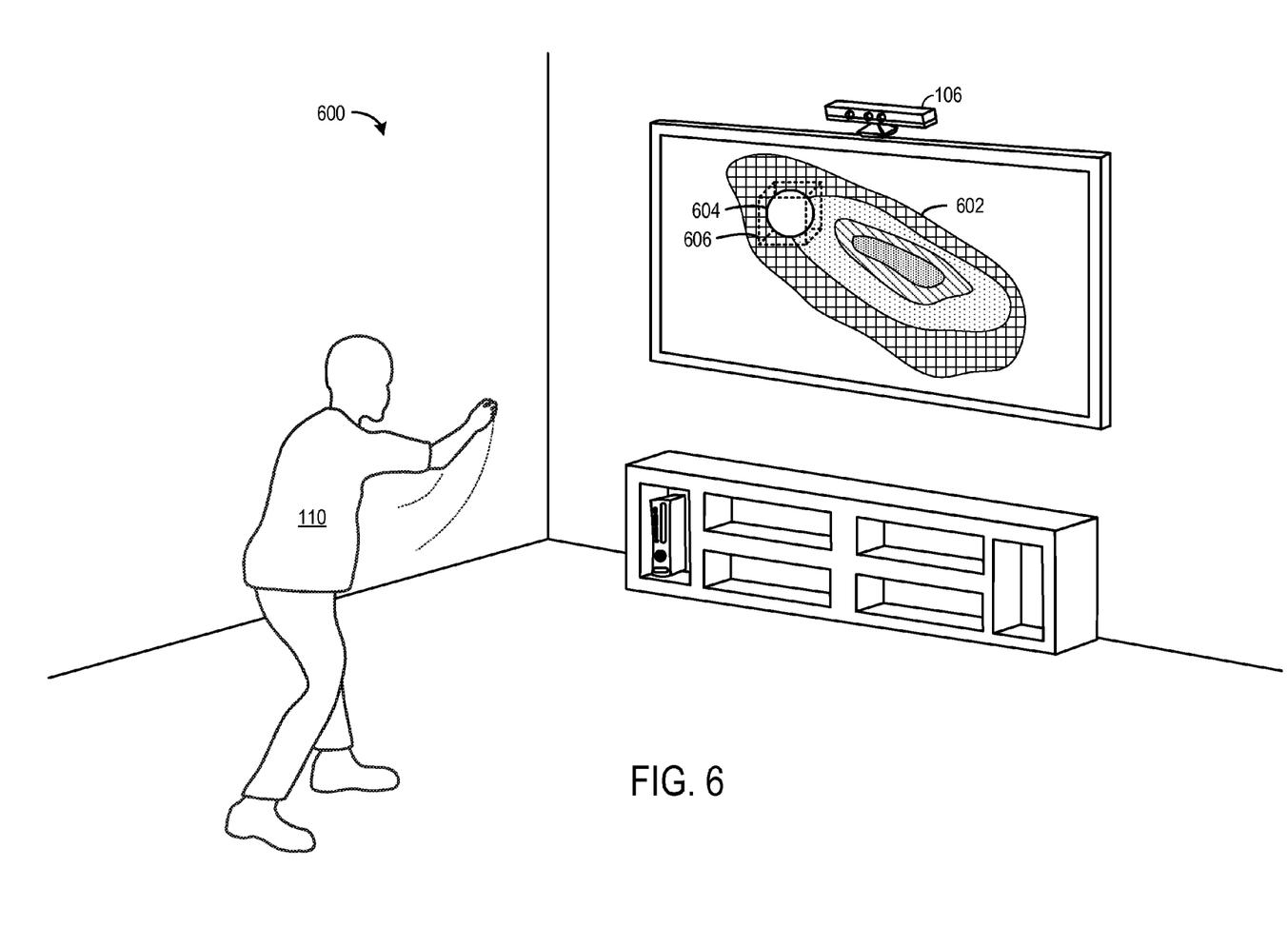
FIG. 6 shows a scenario in which a property of a virtual object may be adjusted based on a region of interest of an energy field in accordance with an embodiment of this disclosure.

FIG. 6 shows a scenario 600 in which an accumulation of values of an energy property of energy elements in a region of interest of an energy field adjust a property of a virtual object that interacts with the region of interest in accordance with an embodiment of this disclosure. The human subject 110 produces motion that generates an energy field 602 in the virtual environment according to specified rules of a physical simulation of the virtual environment. The energy field may be depicted as a heat map that includes different magnitudes of energy elements of the energy field. The energy field may interact with a virtual object 604 in the form of a sphere. A portion of the energy field that interacts with the sphere may be determined to be the region of interest 606. For ease of understanding, the region of interest is depicted as a bounding box that contains the sphere. However, in actuality the bounding box need not be visible to the human subject, and may take the form of the virtual object or a portion of the virtual object within the energy field.

A property of the sphere may be adjusted based on an accumulation of values of one or more energy properties of energy elements in the region of interest. For example, the energy elements in the region of interest may deal an amount of damage to the sphere based on an accumulation of values of an energy property of energy elements in the region of interest. As another example, the energy elements in the region of interest may cause a virtual force to be applied to the sphere. The virtual force may be based on an accumulation of values of an energy property of energy element in the region of interest. It will be understood that any suitable energy property of the energy elements may adjust a property of the sphere in the virtual environment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
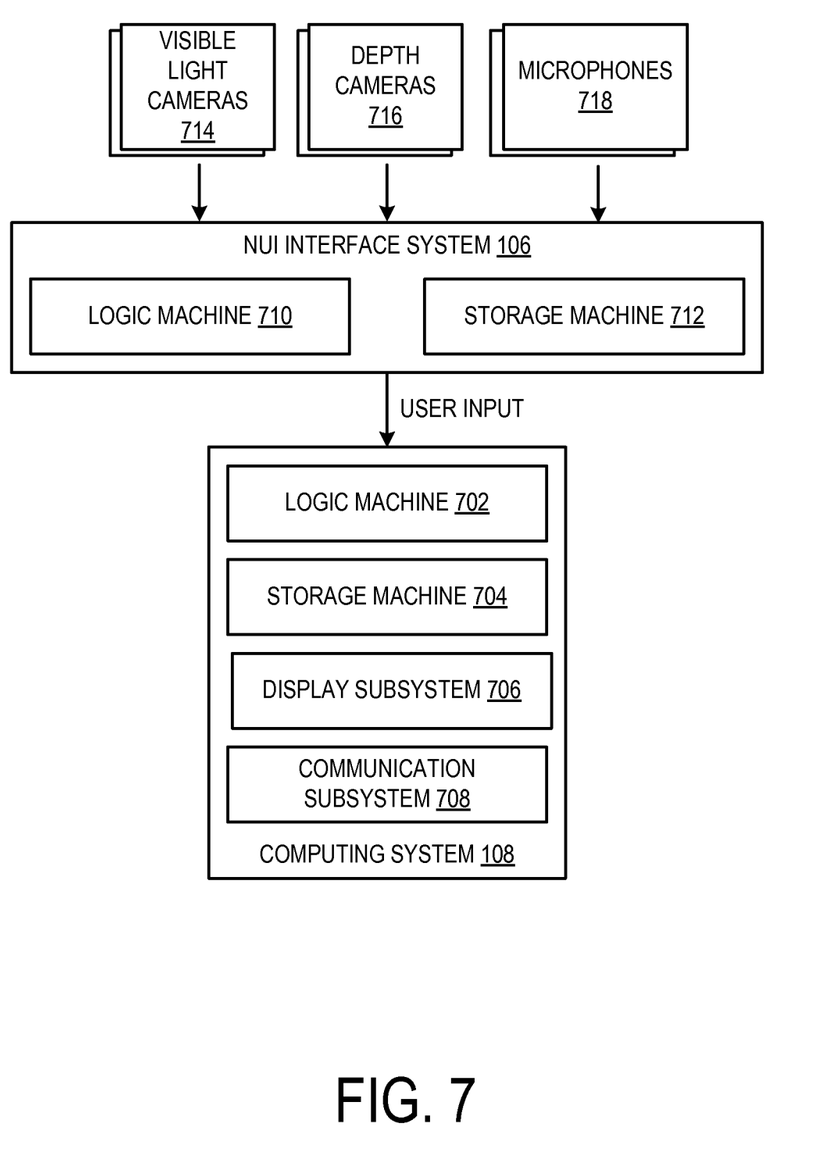
FIG. 7 shows a computing system and an NUI interface system in accordance with an embodiment of this disclosure.

FIG. 7 schematically shows a non-limiting embodiment of a computing system 108 that can enact one or more of the methods and processes described above. Computing system 108 is shown in simplified form. Computing system 108 may take the form of one or more personal computers, server computers, tablet computers, home-entertainment computers, network computing devices, gaming devices, mobile computing devices, mobile communication devices (e.g., smart phone), and/or other computing devices.

Computing system 108 includes a logic machine 702 and a storage machine 704. Computing system 108 may optionally include a display subsystem 706, a communication subsystem 708, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 108 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, communication subsystem 708 may be configured to communicatively couple computing system 108 with one or more other computing devices. Communication subsystem 708 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 108 to send and/or receive messages to and/or from other devices via a network such as the Internet.

As noted above, NUI interface system 106 may be configured to provide user input to computing system 108. To this end, the NUI interface system includes a logic machine 7100 and a storage machine 712. To detect the user input, the NUI interface system receives low-level input (i.e., signal) from an array of sensory components, which may include one or more visible light cameras 714, depth cameras 716, and microphones 718. Other example NUI componentry may include one or more infrared or stereoscopic cameras; a head tracker, eye tracker, accelerometer, and/or gyroscope for motion detection and/or intent recognition; as well as electric-field sensing componentry for assessing brain activity. In some embodiments, the NUI interface system may comprise or interface with one or more user-input devices such as a keyboard, mouse, touch screen, or game controller.

The NUI interface system processes the low-level input from the sensory components to yield an actionable, high-level input to computing system 108. Such action may generate corresponding text-based user input or other high-level commands, which are received in computing system 108. In some embodiments, NUI interface system and sensory componentry may be integrated together, at least in part. In other embodiments, the NUI interface system may be integrated with the computing system and receive low-level input from peripheral sensory components.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a computer-implemented method for controlling a virtual environment, comprising:
   visually presenting, via a display, a representation of the virtual environment;
   receiving, from a depth camera, depth video imaging a human subject;
   recognizing a virtual skeleton that models the human subject with a plurality of virtual joints characterized by three-dimensional positions, the virtual skeleton derived from the depth video;
   using the virtual skeleton to identify a gesture performed by the human subject;
   recognizing an optical flow of the depth video, the optical flow derived from a plurality of cells mapped to the depth video, each cell having a motion value indicating a magnitude of motion in that cell recognized between consecutive image frames of the depth video;
   using the optical flow to assign a magnitude to the gesture performed by the human subject; and
   visually presenting, via the display, an updated representation of the virtual environment, the updated representation being modified based on the gesture, and the updated representation being modified in proportion to the magnitude.

2. The method of claim 1, wherein the plurality of cells is arranged in a grid of cells mapped to image frames of the depth video.

3. The method of claim 1, further comprising:
   generating an energy field created by motion of the human subject as a function of the optical flow and specified rules of a physical simulation of the virtual environment, the energy field including a plurality of energy elements derived from the plurality of cells of the optical flow, each energy element including a plurality of energy properties derived from the motion value of a corresponding cell and the specified rules of the physical simulation, and wherein a property of the virtual environment is further controlled as a function of the energy field.

4. The method of claim 3, wherein the plurality of energy elements of the energy field is arranged in a three-dimensional array.

5. The method of claim 3, wherein generating the energy field includes filtering out motion values from cells indicative of a designated motion.

6. The method of claim 3, wherein the plurality of energy properties of the energy element include a position, magnitude, shape, velocity, and lifespan.

7. The method of claim 3, wherein the gesture is indicative of an attack and the property of the virtual environment is an amount of damage caused by the attack on a virtual object in the virtual environment.

8. The method of claim 3, wherein the property includes a virtual force applied to a virtual object in the virtual environment.

9. The method of claim 1, wherein the virtual skeleton includes a plurality of parts, each part including a corresponding weight such that motion of different parts are weighted differently in terms of magnitude of motion, and the magnitude is further based on a weight of the part associated with the gesture.

10. On a computing device, a computer-implemented method for controlling a virtual environment, comprising:
visually presenting, via a display, a representation of the virtual environment including a virtual object;
receiving, from a depth camera, depth video imaging a human subject;
recognizing an optical flow of the depth video, the optical flow derived from a plurality of cells mapped to the depth video, each cell having a motion value indicating a magnitude of motion recognized between consecutive image frames of the depth video;
generating an energy field created by motion of the human subject as a function of the optical flow and specified rules of a physical simulation of the virtual environment, the energy field including a plurality of energy elements derived from the plurality of cells of the optical flow, each energy element including a plurality of energy properties derived from the motion value of a corresponding cell and the specified rules of the physical simulation;
mapping the energy field to a virtual position in the virtual environment;
adjusting a property of the virtual object in the virtual environment based on one or more energy properties of the plurality of energy elements in response to the virtual object interacting with the virtual position of the energy field; and
visually presenting, via the display, an updated representation of the virtual environment, the updated representation including the virtual object having the adjusted property.

11. The method of claim 10, wherein the plurality of cells is arranged in a grid of cells mapped to image frames of the depth video.

12. The method of claim 10, wherein the plurality of energy elements of the energy field is arranged in a three-dimensional array, and wherein for any given image frame of the depth video the energy field includes an accumulation of energy elements actively contributing energy of motion in that image frame.

13. The method of claim 10, further comprising:
determining a region of interest of the energy field that interacts with the virtual object in the virtual environment, the region of interest being smaller than a volume of the energy field, and wherein the property of the virtual object is adjusted based on an accumulation of values of one or more energy properties of energy elements in the region of interest.

14. The method of claim 13, wherein the one or more energy properties includes a magnitude of motion of the energy elements in the region of interest, the property of the virtual object includes a damage tolerance level, and the magnitudes of the energy elements are accumulated to generate an amount of damage dealt to the virtual object to reduce the damage tolerance level.

15. The method of claim 13, wherein the one or more energy properties includes a magnitude of motion and a velocity of the energy elements in the region of interest, and the magnitudes and the velocities of the energy elements are accumulated to generate a momentum applied to the virtual object.

16. The method of claim 10, wherein generating the energy field includes filtering out motion values from cells representative of a designated type of motion.

17. The method of claim 10, wherein the plurality of energy properties of each energy element include a position, magnitude, shape, velocity, and lifespan.

18. The method of claim 10, wherein the specified rules of the physical simulation specify initialization values of the plurality of energy properties of each energy element and adjust the plurality of energy properties of energy elements in the energy field for image frames of the depth video that images the human subject.

19. On a computing device, a computer-implemented method for controlling a virtual environment, comprising:
visually presenting, via a display, a representation of the virtual environment including a virtual object;
receiving, from a depth camera, depth video imaging a human subject;
recognizing an optical flow of the depth video, the optical flow derived from a plurality of cells mapped to the depth video, each cell having a motion value indicating a magnitude of motion recognized between consecutive image frames of the depth video;
generating an energy field created by motion of the human subject as a function of the optical flow and specified rules of a physical simulation of the virtual environment, the energy field including a plurality of energy elements derived from the plurality of cells of the optical flow, each energy element including a plurality of energy properties derived from the motion value of a corresponding cell and the specified rules of the physical simulation;
mapping the energy field to a virtual position in the virtual environment;
determining a region of interest of the energy field that interacts with a virtual object in the virtual environment, the region of interest being smaller than a volume of the energy field;
adjusting a property of the virtual object in the virtual environment based on an accumulation of values of one or more energy properties of energy elements in the region of interest; and
visually presenting, via the display, an updated representation of the virtual environment, the updated representation including the virtual object having the adjusted property.

20. The method of claim 19, wherein the virtual object is a virtual character, the one or more energy properties includes a magnitude of motion of the energy elements in the region of interest, the property of the virtual character includes a damage tolerance level, and the magnitudes of the energy elements are accumulated to generate an amount of damage dealt to the virtual character to reduce the damage tolerance level.

* * * * *